United States Patent [19]
Watson et al.

[11] 3,720,920
[45] March 13, 1973

[54] OPEN-ENDED COMPUTER WITH SELECTABLE I/O CONTROL

[75] Inventors: William J. Watson; Edwin H. Husband, both of Richardson, Tex.

[73] Assignee: Texas Instruments Incorporated, Dallas, Tex.

[22] Filed: March 1, 1971

[21] Appl. No.: 119,861

Related U.S. Application Data

[63] Continuation of Ser. No. 838,081, Sept. 1, 1969, abandoned.

[52] U.S. Cl. ....................340/172.5
[51] Int. Cl. ....................G06f 3/00
[58] Field of Search ....................340/172.5

[56] References Cited

UNITED STATES PATENTS

| | | | |
|---|---|---|---|
| 3,599,160 | 8/1971 | Nestle | 340/172.5 |
| 3,500,466 | 3/1970 | Carleton | 340/172.5 |
| 3,408,632 | 10/1968 | Hauck | 340/172.5 |
| 3,396,372 | 8/1968 | Calvert | 340/172.5 |
| 3,512,133 | 5/1970 | Bennett et al. | 340/172.5 |
| 3,419,849 | 12/1968 | Anderson et al. | 340/172.5 |

*Primary Examiner*—Harvey E. Springborn
*Attorney*—Samuel M. Mims, Jr., James O. Dixon, Andrew M. Hassell and Henry T. Olsen

[57] ABSTRACT

An automatic data processing machine of open-ended construction having communication register units in a peripheral process that are addressable by means of a single instruction in the bit, byte, half-word or full-word level for implementing a broad range of I/O operations.

1 Claim, 7 Drawing Figures

INVENTORS
EDWIN H. HUSBAND
WILLIAM J. WATSON

ATTORNEY

OPEN-ENDED COMPUTER WITH SELECTABLE I/O CONTROL

This application is a continuation of applicants prior application S. N. 838,081 filed September 1, 1969, now abandoned. More particularly, the present invention involves a combination of hardware and software involving use of the communication registers illustrated and described in connection with the above-identified application and, more particularly, the communication register unit shown in FIG. 11 of U.S. Pat. No. 3,573,852.

This invention relates to an automatic data processing machine which is of open-ended construction in that it provides a communication register unit which is addressable by a single instruction on the bit, byte, half-word or word level.

The present invention is incorporated in a computer system having the versatility necessary for handing conventional types of data processing operations as well as large sets of ordered data as described in U.S. Pat. No. 3,573,852, and therefore may be used to great advantage in other processors.

In such a setting, as well as in computers which are not capable of handling with such efficiency large sets of ordered data, the present invention provides for an open-ended construction. This permits a wide range of I/O operations to be accommodated. In a more specific sense, the invention involves the provision of communication register units which may be addressed at the bit, byte, half-word or full-word level as to minimize the process of matching the computer to I/O devices of any character with the ability to address the same with a single instruction.

In accordance with the present invention an automatic data processing machine is provided wherein a central processing unit and peripheral processing unit are provided. The peripheral processor services the central processing unit at least in part through the operation of an arithmetic unit therein. A plurality of communication register units are provided in the peripheral processor with the means responsive to single-word instruction for enabling or signaling I/O channels of single-line or multiple-line, of quarter-word, half-word or word length.

In a more specific aspect, there is provided a communication register unit in the peripheral processor of a computer system which includes a central processor, memory, control and I/O units. Program storage means in the peripheral processor control the communication register file in response to instructions. Logic means interconnect the program storage means and the communication register file in response to a single program instruction from the program storage means for selectively addressing one of a bit, byte, half-word and word of any one of the communication registers in the communication register file.

In a further aspect, the communication registers each have a plurality of input/output lines, one for each bit position. Logic means responsive to single instructions selectively enable one of (i) one of said output lines, (ii) an integer multiple of one, and (iii) an integer multiple of the highest of said integer multiple of said output lines. I/O controlled means having at least one external device is control-connected directly to one bit position in one communication register for response to the control state of the one bit position. Storage means store control states in a memory in the peripheral processor for directly addressing the one bit position with a single instruction to energize the external device and a single instruction to deenergize same. Means are provided for selective applying stored control states to the control logic.

In a preferred embodiment, the states corresponding to or forming the instructions include an OP field, a T and N field for addressing a given communication register and for selecting a fraction thereof in which the bit to be addressed resides, and a mask field for changing the state of the one bit in said fraction while retaining the capability of simultaneously setting or resetting two, three or all bits in said fraction in dependence upon the state corresponding with the mask.

For a more complete understanding of the invention and for further objects and advantages thereof, reference may now be had to the following description taken in conjunction with the accompanying drawings in which.

Figure 1:
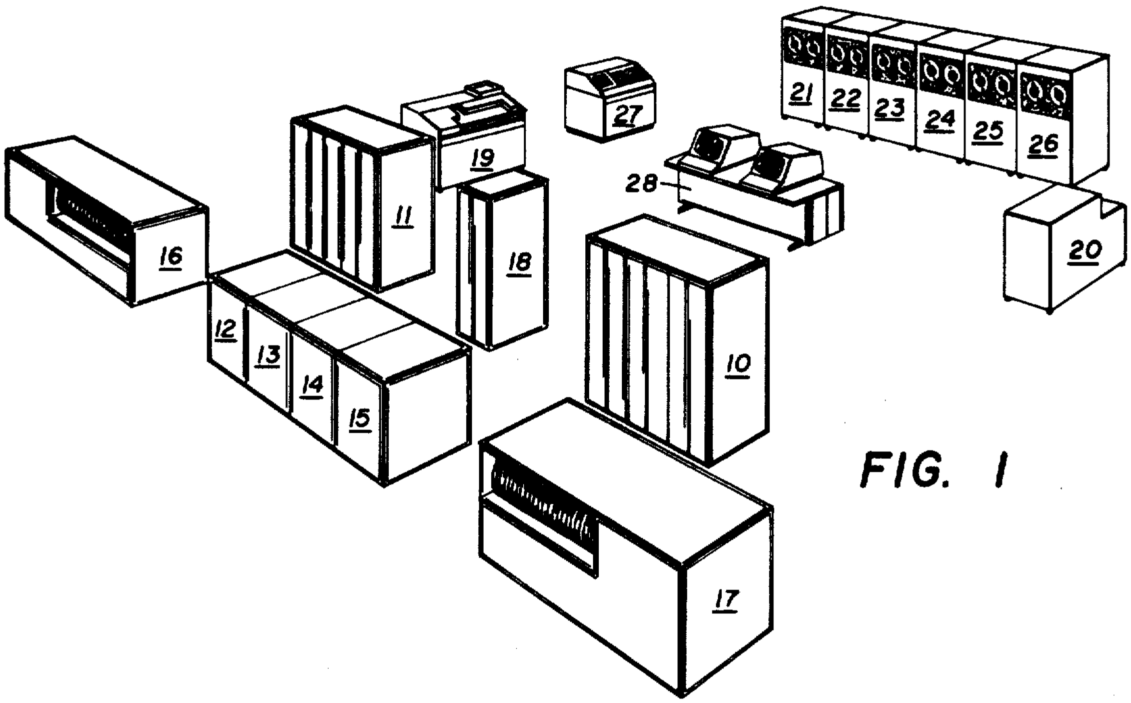
FIG. 1 illustrates a preferred arrangement of the components of a computer system embodying the invention.
Figure 2:
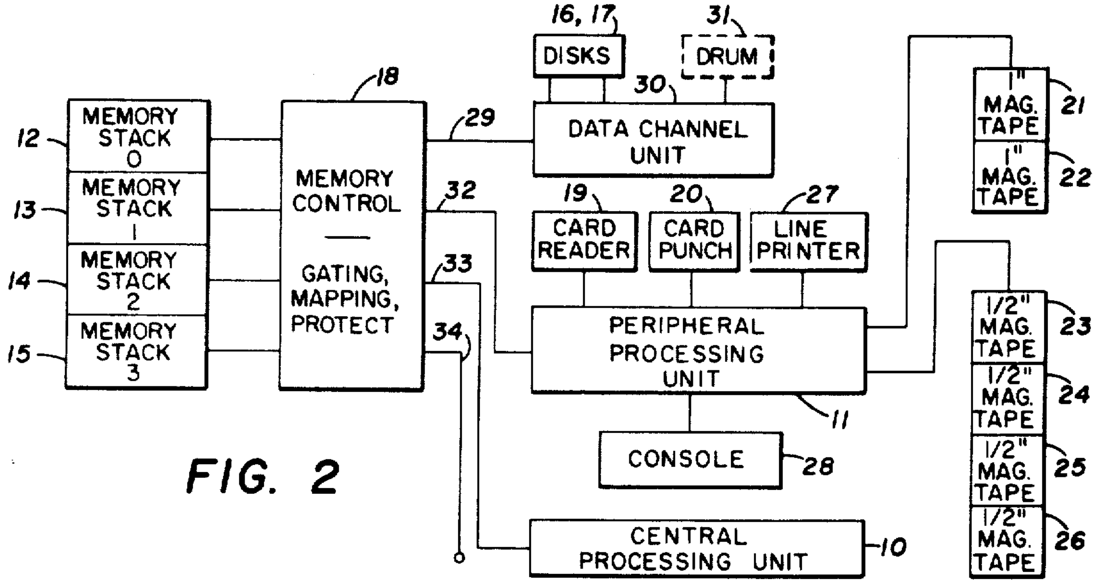
FIG. 2 is a block diagram of the system of FIG. 1.
Figure 4:
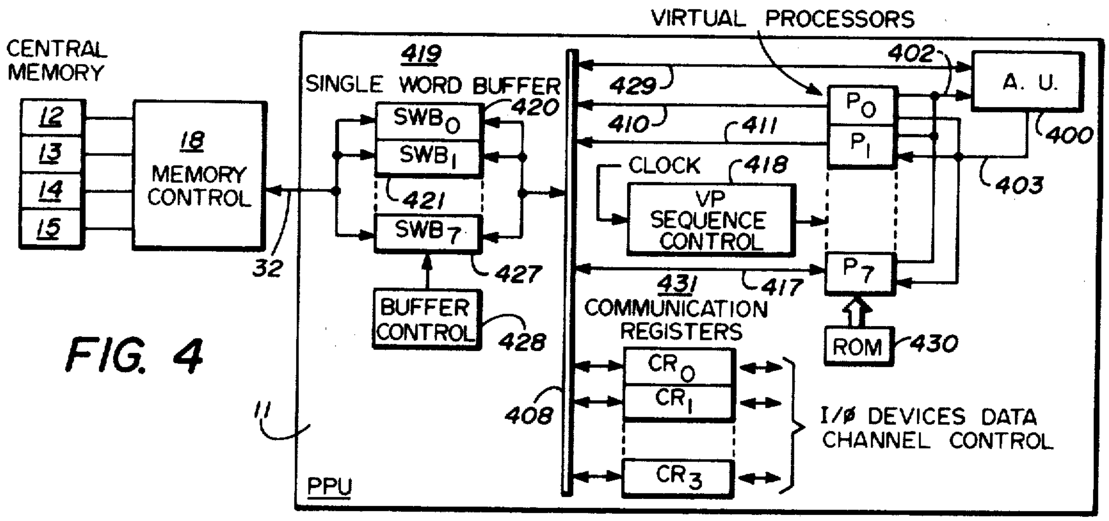
Figure 7:
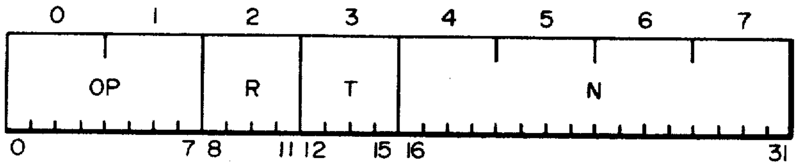
Figure 6:
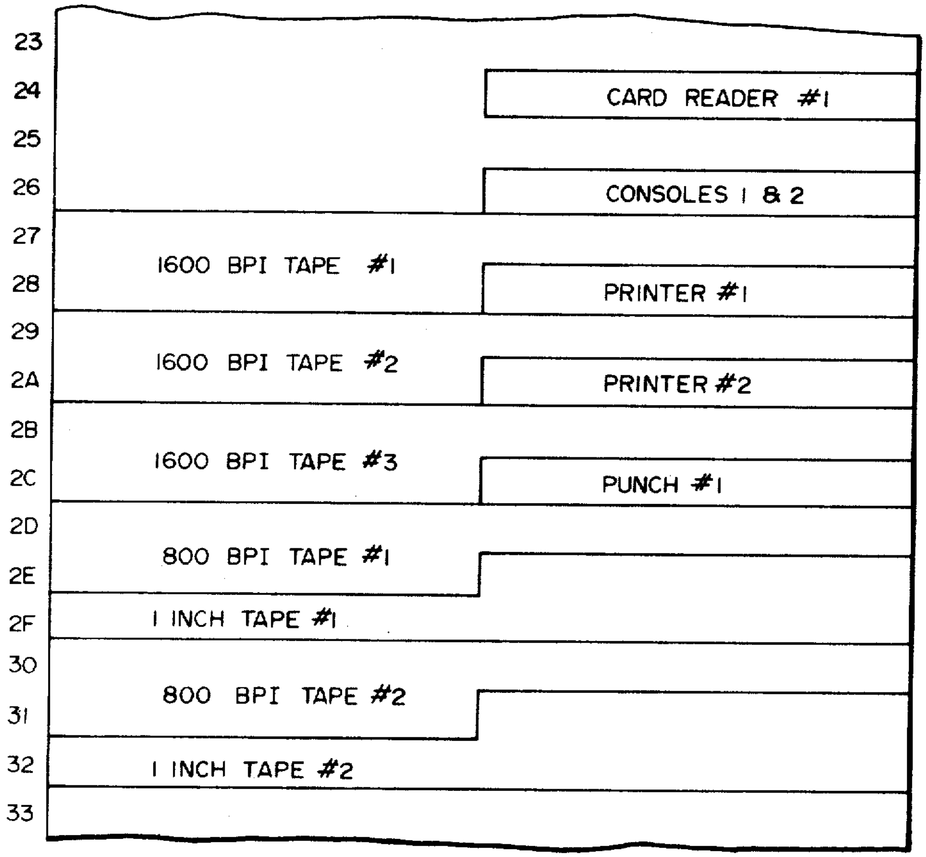
Figure 5:
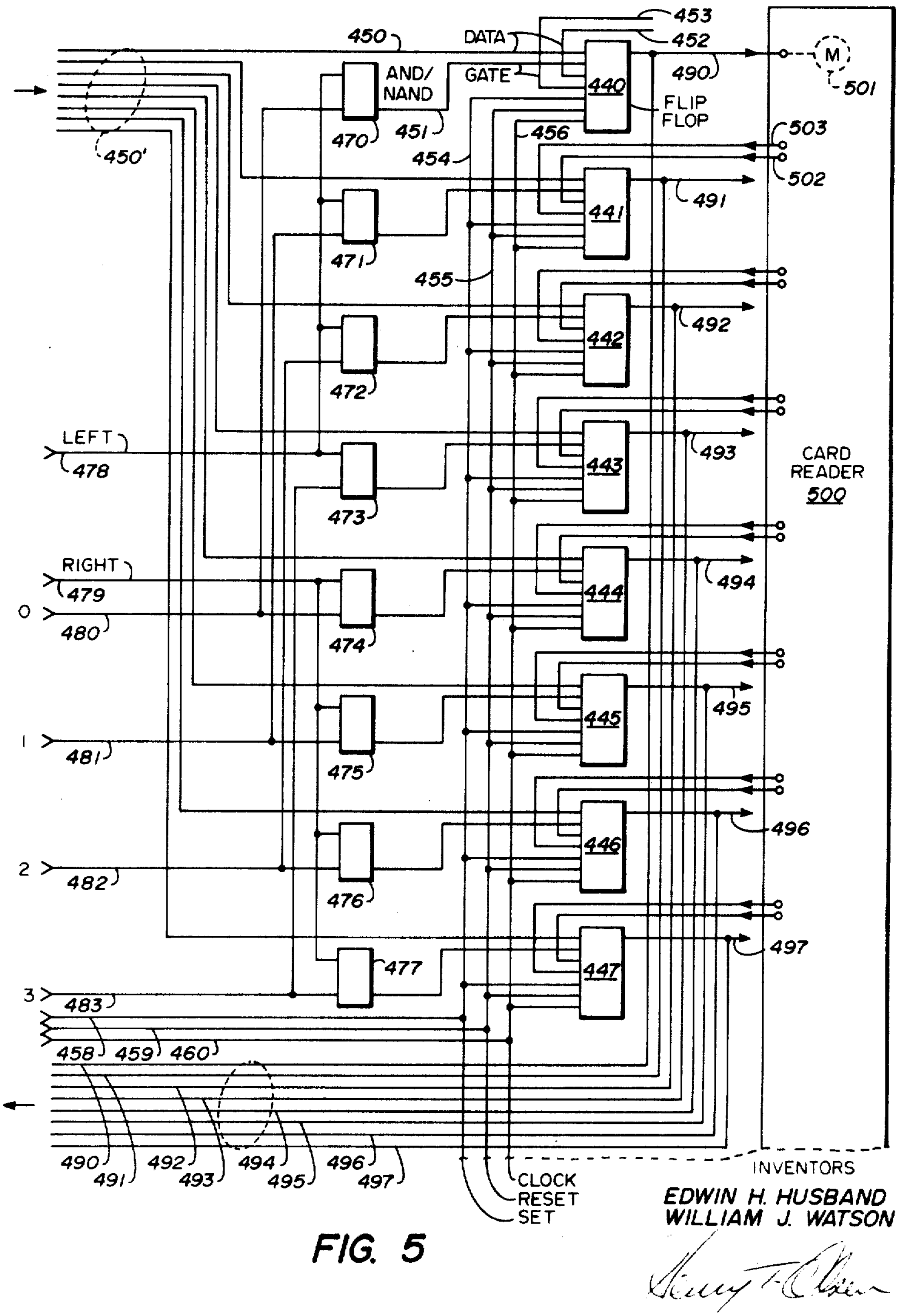

FIG. 4 diagrammatically illustrates the peripheral processor of FIGS. 1 and 2;

FIG. 5 is a detailed diagram of one-fourth of one communication register in the peripheral processor;

FIG. 6 illustrates assignment of a portion of the communication register file of FIG. 4; and FIG. 7 illustrates instruction format for addressing a single bit in the communication register file.

The peripheral processor communication register operation of the present invention will be described in connection with an advanced scientific computer system of U.S. Pat. No. 3,573,852. Pertinent portions of the computer will first be described generally and then the role of the present invention and its interreaction with other components of the system will be described.

The memory buffer and its operation are described and claimed in copending application Ser. No. 744,190, filed July 11, 1968 and now U.S. Pat. No. 3,573,851, by Thomas E. Cooper, William D. Kastner, and William J. Watson.

The pipeline system shown in FIGS. 7 and 8 is described and claimed in copending application Ser. No. 743,573, filed July 9, 1968 and now abandoned, by Charles M. Stephenson and William J. Watson.

The automated context switching operation and system shown in FIGS. 3, 4, 8 and 9 is described and claimed in copending application Ser. No. 743,572, filed July 9, 1968 and now U.S. Pat. No. 3,614,742, by William D. Kastner and William J. Watson.

FIGURE 1

Referring to FIG. 1, the computer system includes a central processing unit (CPU) 10 and a peripheral processing unit (PPU) 11. Memory is provided for both CPU 10 and PPU 11 in the form of four modules of thin film storage units 12–15. Such storage units may be of the type known in the art. In the form illustrated, each of the storage modules provides 16,384 data words.

The memory provides for 160 nanosecond cycle time and on the average 100 nanosecond access time. Memory blocks of 256 bits each are divided into 8 zones of 32 bits each. Each zone constitutes a data word. Thus, the memory data blocks are stored in blocks of 8 words and there are 2,048 data memory blocks per module.

In addition to storage modules 12–15, rapid access disk storage modules 16 and 17 are provided wherein the access time on the average is about 16 milliseconds per sector where a sector, in this system, is 64 words.

A memory control unit 18 is also provided for control of memory operation, access and storage.

A card reader 19 and a card punch unit 20 are provided for input and output. In addition, tape units 21–26 are provided for input/output (I/O) purposes as well as storage. A line printer 27 is also provided for output service under the control of the PPU 11.

It is to be understood that the memory or storage hierarchy is of four levels. The most rapid access storage is in the CPU 10. The next most rapid access is in the thin film storage units 12–15. The next most available storage is the disk storage units 16 and 17. Finally, the tape units 21–26 complete the storage array.

A cathode ray tube (CRT) monitor console 28 is provided. The console 28 consists of two adapted CRT-keyboard terminal units which are operated by the PPU 11 as input/output devices. The console may also be used by an operator to command the system for both hardware and software checkout purposes and to interact with the system in an operational sense, permitting the operator through the console 28 to interrupt a given program at a selected point for review of any operation, its progress or results, and then to determine the succeeding operation. Such operations may involve the further processing of the data or may direct the unit to undergo a transfer in order to operate on a different program or on different data.

FIGURE 2

Referring to FIG. 2, memory stacks 12–15 are controlled by the memory control 18 in order to input or output word data to and from the memory stacks. Additionally, memory control 18 provides gating, mapping, and protection of the data within the memory stacks as required.

A signal bus 29 extends between the memory control 18 and a buffered data channel unit 30 which is connected to the disk 16 and 17. The data channel unit 30 has for its sole function the support of the memory shown as disks 16 and 17 and is a simple wired program computer capable of moving data to and from memory disks 16 and 17. Upon command only, the data channel unit 30 may move memory data from the disks 16 and 17 via the bus 29 through the memory control 18 to the memory stacks 12–15.

A magnetic drum memory 31 (shown dotted), if provided, may be connected to the data channel unit 30 when it is desired to expand the memory capability of the computer system.

A single bus 32 connects the memory control 18 with the PPU 11. As will be described, PPU 11 operates all I/O devices except the disks 16 and 17. Data from the memory stacks 12–15 are processed to and from the PPU via the memory control 18 in eight-word blocks.

When read from memory, a read/restore operation is carried out in the memory stack. The eight words are "funneled down" with only one of the eight words being used within the PPU 11. This "funneling down" of data words within the PPU 11 is desirable because of the relatively slow usage of data required by the PPU 11 and the I/O devices, as compared with the CPU 10. A typical available word transfer rate for an I/O device controlled by the PPU 11 is about 100 kilowords per second.

The PPU 11 contains eight virtual processors therein, the majority of which may be programmed to operate various ones of the I/O devices as required.

The virtual processors may be of the general type illustrated and described in U.S. Pat. No. 3,337,854 to Cray et al. In that patent the virtual processor occupies six times slots as opposed to the virtual processors disclosed herein which have variable time slots. The virtual processors as disclosed take instructions from either read only memory or the central memory and operate upon these instructions. The virtual processors include program counters and a time shared arithmetic unit in the peripheral processing unit. The virtual processors execute programs under instruction control. The tape units 21 and 22 operate upon a one inch wide magnetic tape while the tape units 23–26 operate with one-half inch magnetic tapes to enhance the capabilities of the system.

The PPU 11 operates upon the program contained in memory and executed by virtual processors in a most efficient manner and additionally provides monitoring controls to programs being run in the CPU 10.

CPU 10 is connected to memory stacks 12–15 through the memory control 18 via a bus 33. The CPU 10 may utilize all eight words in a word block provided from the memory stacks 12–15. Additionally, the CPU 10 has the capability of reading or writing any combination of those eight words. Bus 33 handles three words every 50 nanoseconds, two words input to the CPU 10 and one word output to the memory control 18.

As described in U.S. Pat. No. 3,573,852, the CPU 10 has the capability of carrying out compound vector operations specified directly at machine level without the requirement of translation of some compilor language.

A bus 34 is provided from the memory control 18 to be utilized when the capabilities of the computer system are to be enlarged by the addition of other processing units and the like.

Each of the buses 29, 32, 33 and 34 is independently gated to each memory module, thereby allowing memory cycles to be overlapped to increase processing speed. A fixed priority preferably is established in the memory controls to service conflicting request from the various units connected to the memory control 18. The internal memory control 18 is given the highest priority, with the external buses 29, 32, 33 and 34 being serviced in that order. The external bus-processor connectors are identical, allowing the processors to be arranged in any other priority order desired.

FIGURE 3

Figure 3:
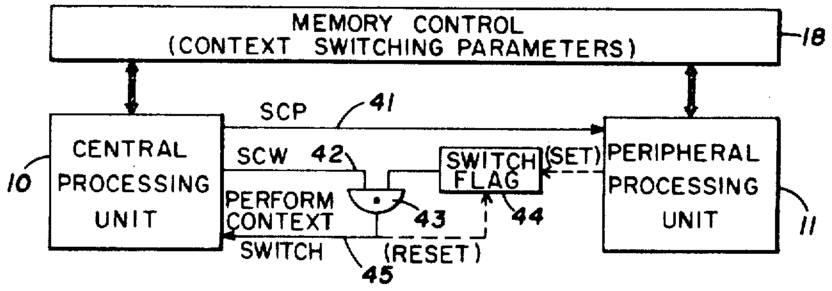
FIG. 3 illustrates a context switching between the central processor unit and the peripheral processor unit of FIGS. 1 and 2.

FIG. 3 illustrates a block diagram, the interface circuitry between the PPU 11 and the CPU 10 to provide automatic context switching of the CPU while "looking ahead" in time in order to eliminate time consuming dialog between the PPU 11 and CPU 10. In operation, the CPU 10 executes user programs on a multi-program basis. The PPU 11 services requests by the programs being executed by the CPU 10 for input and output services. The PPU 11 also schedules the sequence of user programs operated upon by the CPU 10.

More particularly, the user programs being executed within the CPU 10 request I/O service from the PPU 11 by either a "system call and proceed" (SCP) command or a "system call and wait" (SCW) command. The user program within the CPU 10 issues one of these commands by executing an instruction which corresponds to the call. The SCP command is issued by a user program when it is possible for the user program to proceed without waiting for the I/O service to be provided but while it proceeds, the PPU 11 can secure or arrange new data or a new program which will be required by the CPU in future operations. The PPU 11 then provides the I/O service in due course to the CPU 10 for use by the user program. The SCP command is applied by way of the signal path 41 to the PPU 11.

The SCW command is issued by a user program within the CPU 10 when it is not possible for the program to proceed without the provision of the I/O service from the PPU 11. This command is issued via line 42. In accordance with the present invention the PPU 11 constantly analyzes the programs contained within the CPU 10 not currently being executed to determine which of these programs is to be executed next by the CPU 10. After the next program has been selected, the switch flag 44 is set. When the program currently being executed by the CPU 10 reaches a state wherein SCW request is issued by the CPU 10, the SCW command is applied to line 42 to apply a perform context switch signal on line 45.

More particularly, a switch flag unit 44 will have enabled the switch 43 so that an indication of the next program to be executed is automatically fed via line 45 to the CPU 10. This enables the next program or program segment to be automatically picked up and executed by the CPU 10 without delay generally experienced interrogation by the PPU 11 and a subsequent answer by the PPU 11 to the CPU 10. If, for some reason, the PPU 11 has not yet provided the next program description, the switch flag 44 will not have been set and the context switch would be inhibited. In this event, the user program within the CPU 10 that issued the SCW call would still be in the user processor but would be in an inactive state waiting for the context switching to occur. When context switching does occur, the switch flag 44 will reset.

The look ahead capability provided by the PPU 11 regarding the user program within the CPU 10 not currently being executed enables context switching to be automatically performed without any requirement for dialog between the CPU 10 and the PPU 11. The overhead for the CPU 10 is dramatically reduced by this means, eliminating the usual computer dialog.

FIGURE 4

The organization of the PPU 11 is shown in FIG. 4. The central memory 12-15 is coupled to MCU 18 and then to channel 32. Virtual processors $P_0$–$P_7$ are connected to the AU 400 by means of the bus 402 with the AU 400 communicating back to the virtual processors $P_0$–$P_7$ by way of bus 403. The virtual processors $P_0$–$P_7$ communicate with the internal bus 408 of the PPU 11 by way of channels 410–417. A buffer unit 419 having eight single word buffer registers 420–427 is provided. One register is exclusively assigned to each of the virtual processors $P_0$–$P_7$. The virtual processors $P_0$–$P_7$ are provided with a sequence control unit 418. Control unit 418 is driven by clock pulses. The buffer unit 419 is controlled by a buffer control unit 428. A channel 429 extends from the internal bus 408 to the AU 400.

The virtual processors $P_0$–$P_7$ are provided with a fixed read-only memory 430. In one embodiment of PPU 11, the read-only memory 430 is made up of prewired diode arrays for rapid access. The shared elements include the AU 400, the read-only memory (ROM) 430, the file of communication registers (CR) 431, and the single word buffer (SWB) 419 which provides access to central memory (CM) 12–15.

The ROM 430 contains a pool of programs and is not accessed except by reference from the program counters of the virtual processors. The pool includes a skeletal executive program and at least one control program for each I/O device connected to the system. The ROM 430 has an access time of 20 nanoseconds and provides 32 bit instructions to the $P_0$–$P_7$ units. Total program space in ROM is 1024 words. The memory is organized into 256 word modules so that portions of programs can be modified without complete refabrication of the memory.

The source of instructions for the virtual processors may be either ROM 430 or CM 12–15. The memory being addressed from the program counter in a virtual processor is controlled by the addressing mode which can be modified by the branch instructions or by clearing the system. Each virtual processor is placed in the ROM mode when the system is cleared.

When a program sequence is obtained from central memory, it is acquired via the buffer 419. Since this is the same buffer used for data transfers to or from CM 12–15, and since central memory access is slower than ROM access, execution time is more favorable when program is obtained from ROM 430.

The virtual processors share parts of the system and, therefore, must be ordered in access. This is done by assigning time slots in the desired order to each virtual processor. A time slot zero may be assigned to one of the eight virtual processors by a manual switch. This assignment cannot be controlled by the program. The remaining time slots are initially unassigned. Therefore, only the virtual processor selected by the manual switch operates at the outset. Furthermore, program counters in each of $P_0$–$P_7$ are initially cleared and selected virtual processor begins executing program from address 0 of ROM 430 which contains a starter program.

The buffer 419 provides the virtual processors access to CM 12–15. The buffer 419 consists of eight 32-bit data registers, eight 24-bit address registers, and controls. Viewed by a single processor, the buffer 419 appears to be only one memory data register and one memory address register.

At any given time the buffer 419 may contain up to eight memory requests, one for each virtual processor.

These requests preferably are processed on a combined basis of fixed priority and first-in, first-out priority. Preferably four priority levels are established and if two or more requests of equal priority are unprocessed at any time, they are handled first in, first out.

When a request arrives at the buffer 419, it automatically has a priority assignment determined by the memory 12–15 priority file maintained in one of the registers 431. The file is arranged in accordance with virtual processor numbers, and all requests from a particular processor receive the priority encoded in two bits of the priority file. The contents of the file are programmed by the executive program, and the priority code assignment for each virtual processor is a function of the program to be executed. In addition to these two priority bits, a time tag may be employed to resolve the cases of equal priority.

The I/O device programs may include control functions for the device storage media as well as data transfer functions. Thus, motion of mechanical devices can be controlled directly by the program rather than by highly special purpose hardware for each device type. Variations to a basic program are provided by parameters supplied by the executive program. Such parameters are carried in CM 12–15 or in the accumulator registers of the virtual processor executing the program.

I/O SYSTEM - COMMUNICATION REGISTER

In accordance with the present invention, communication registers 431 provide for communicating between the bus 408, the I/O devices and data channels. In one embodiment of the invention, 64 communication registers were provided in unit 431 each of 32 bit length.

The communication registers 431 are each of 32 bits. Each register is addressable from the virtual processors, and can also be read or written by the device to which it connects. The registers 431 provide the control and data links to all peripheral equipment including the system console. Some parameters which control system functioning are also stored in the communication registers 431 from where the control is exercised.

FIGURE 5

FIG. 5 illustrates a suitable construction for the communication register system, showing 8 of 32 bits in one register. Each cell in register 431 has two sets of inputs. One set is connected into the PPU 11, and the other set is available for use by the peripheral device. Data from the PPU 11 is always transferred into the cell in synchronism with the system clock. The gate for writing into the cell from the external device may be generated by the device interface and not necessarily synchronously with the system clock.

More particularly, each of the CR units 431 may be addressed by a single instruction either at the bit, byte, half-word or word level. As shown in FIG. 5, the circuit comprises one-fourth of register $CR_{24}$ of the communication register 431.

Register $CR_{24}$ includes 32 output flip-flops, eight of which, the units 440–447, are shown. Each of the flip-flops has two data lines and two gate lines. Line 450 is a data line. Line 451 is a gate line. Line 452 is a data line. Line 453 is a gate line. Line 454 is a set line, line 455 is a reset line, and line 456 is a clock input line. The circuits for flip-flops 441–447 are the same as for flip-flop 440.

Lines 454, 455 and 456 are common to all eight flip-flops 440–447, and lead to terminals 458–460, respectively.

The gate line 451 is connected to the output of an AND/NAND gate 470. Similarly, gates 471–477 are connected with each of gates 441–447, respectively. Gate 470 has two inputs, one of which is common to a single input on each of gates 471, 472, and 473 and leads to a left select line 478. Similarly, one terminal of each of gates 474–475 leads to a common right select line 479. A mask line 480 leads to one input of both gates 470 and 474. A second mask line 481 leads to one input of each of gates 471 and 475. The third mask line 482 leads to one input of gates 472 and 476 and a fourth mask line 483 leads to one input of gates 473 and 477. Eight data lines 450', one line to each of the output flip-flops, supply data signals to the flip-flops 440–447. The data line, the gate line, and the clock line are anded in the flip-flop.

In this embodiment, the flip-flops were of the type manufactured and sold by Texas Instruments Incorporated and identified as integrated circuits Type WO(AC1056). The AND/NAND gates were Texas Instruments Incorporated integrated circuits AND/NAND gate type AC1044.

Output lines 490–497 may each lead to a separate I/O device, and thus, any one of lines 490–497 may be actuated or energized for control of I/O operations. Alternatively, all of lines 490–493 or all of lines 494–497 may be energized. Further, all of lines 490–497 may be simultaneously energized, depending upon the control states applied by way of lines 478–483.

In the portion of the system shown in FIG. 5, line 490 is connected to I/O unit 500, a card reader. As to the remaining output lines 491–497, they are connected only to the computer for flow of data from reader 500. Line 490 is connected to the control circuit for the reader motor 501. The data line 452 and the gate line 453 leading from flip-flop 440 are not utilized since the single bit represented by the output of flip-flop 440 is used to control the motion of the motor 501. While other output lines from other flip-flops in the communication register, of which FIG. 5 is a part, may be used for flow to the reader 500, the desirability of being able to address the single bit unit 440 to start or stop motor 501 becomes readily apparent. The communication register, thus, provides flow channels for data and provides gates leading to and from I/O units such as reader 500 each addressable at the bit level. By means of the data and gate lines such as lines 502 and 503 the flow of data from the reader 500 is provided.

In one embodiment of the invention, 64, 32 bit communication registers comprises the file. In addition to having some of said registers assigned to virtual processors, to forming a time slot table, serving as unit registers, command registers and for peripheral processor maintenance control, startup and the like, a section of the file was dedicated, or assigned, as illustrated in FIG. 6. That is, one-half of the communication register 24 was assigned to Card Reader 1, one-half of communication register 26 was assigned to Console 28 (shown in FIG. 1). Communication register 27 and one-half of communication register 28 were assigned to a 1,600 bit per inch Tape 1. One-half of communication register 28 was assigned to Printer 1. Communication register 29 and one-half of communication register 2A were assigned to 1,600 bit per inch Tape 2. One half of register 2A was assigned to Printer 2. Similarly, the other registers 2B–35 were assigned as shown in FIG. 6.

In each case, having assigned registers or portions thereof to a given function, then the circuits between the I/O unit and the various bit positions in the respective registers are connected as by suitable plugs or fixed wire arrangements as may be desired, the connections being indicated by the double arrows shown in FIG. 5 between the registers 440–447 and reader 500. The registers were so connected as to provide control of the flow of data and control signals to and from the computer.

In FIG. 7, the addressing format for the communication registers is indicated. The instruction word format includes four fields OP, R, T, and N. The OP field is eight bits long, and R and T fields are four bits each, and the N field is 16 bits. The OP field, consisting of eight bits preferably represented by a hexadecimal OP code, specifies the operation to be performed. Most operations fall into families of three where numbers of the family specify whole words, half words or byte class of operation.

The R field usually specifies location in a virtual processor register or a CR file.

The T,N field together function to specify an immediate operand, and operand address or a branch address. For example, the set/reset CR bit instructions may be as follows. TABLE I

| | OP CODE | R FIELD | T,N FIELD |
|---|---|---|---|
| SET LEFT HALF (SL) R OR (r) → r "1's" are set in those bit positions marked by "1's" in the R field, in the left half of the CR byte operand specified by the address in the T,N fields. Indirect addressing is undefined. | FA | Mask | CR |
| SET RIGHT HALF (SR) R OR (r) → r "1's" are set in those bit positions marked by "1's" in the R field, in the right half of the CR byte operand specified by the address in the T,N fields. Indirect addressing is undefined. | FE | Mask | CR |
| RESET LEFT HALF (RL) $\bar{R}\cdot(r)\rightarrow r$ "0's" are set in those bit positions marked by "1's" in the R field, in the left half of the CR byte operand specified by the address in the T,N fields. Indirect addressing is undefined. | F2 | Mask | CR |
| RESET RIGHT HALF (RR) $\bar{R}\cdot(r)\rightarrow r$ "1's" are set in those bit positions marked by "1's" in the R field, in the right half of the CR byte operand specified by the address in the T,N fields. Indirect addressing is undefined. | | | |

Thus, the OP code designates an operation. The T and N fields specify or identify which of the registers in the file 431 is to be addressed. A mask then is applied in the R field. The T and N field will specify the quarter word to be addressed. The OP code specifies whether line 478 or line 479 is enabled. If line 478 is enabled, then the left or upper half of the set of channels in FIG. 5 will be accessible. The set of states in the R field determine whether one, two, three or four of the units 470, 471, 472 and 473 will be enabled thus controlling whether outline 490, 491, 492 or 493 or any combination of the same will be enabled. Direct addressing of the communication register at either the bit level such as line 490, a hex character level such as all of lines 490–493, or the quarter-word level such as represented by all of lines 490–497.

In the embodiment of the system described herein, the system is operated synchronously. The CPU 10 has a clock producing pulses at 50 nanosecond intervals. The clock in PPU 11 produces clock pulses at 65 nanosecond intervals.

We claim:

1. A data processing system comprising:

a. a processing unit adapted to decode instructions, b. a memory for storing said instructions, c. a communication register having a plurality of bit positions, d. a controlled device connected directly to one bit position in said communication register, said controlled device responsive to the control state of said one bit position, and e. means responsive to an instruction decoded by said processing unit directly addressing said one bit position in said communication register, said one bit position when directly addressed controlling said controlled device.

* * * * *

UNITED STATES PATENT AND TRADEMARK OFFICE

CERTIFICATE OF CORRECTION

PATENT NO. : 3,720,920

DATED : March 13, 1973

INVENTOR(S) : WILLIAM J. WATSON and EDWIN H. HUSBAND

It is certified that error appears in the above-identified patent and that said Letters Patent are hereby corrected as shown below:

On the cover page, change "Continuation of Ser. No. 838,081, Sept. 1, 1969, abandoned." to read --Continuation of Ser. No. 838,081, July 1, 1969, abandoned.--

Signed and Sealed this

*Seventeenth* Day of *July 1984*

[SEAL]

*Attest:*

GERALD J. MOSSINGHOFF

*Attesting Officer* *Commissioner of Patents and Trademarks*